Oct. 7, 1958     C. W. YETTON     2,855,201
ACROBATIC EQUIPMENT
Filed Dec. 5, 1957
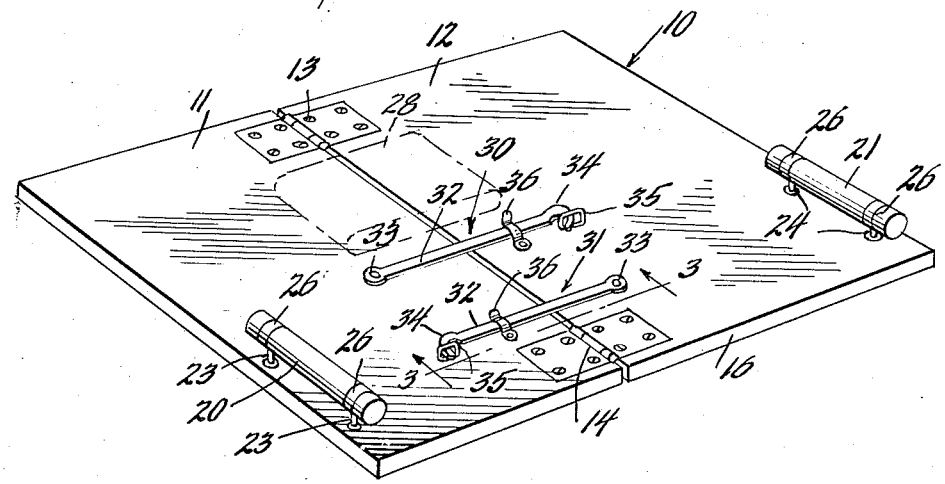
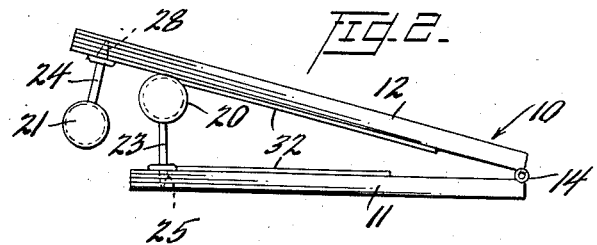
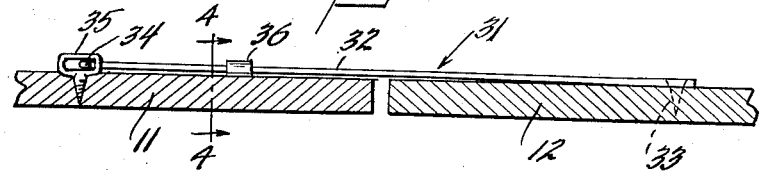
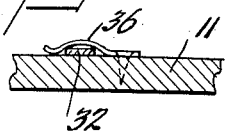
INVENTOR
Charles W. Yetton
BY Watson, Cole, Grindle & Watson
ATTORNEYS

2,855,201
ACROBATIC EQUIPMENT
Charles William Yetton, Brooklyn, N. Y.

Application December 5, 1957, Serial No. 700,774

2 Claims. (Cl. 272—60)

This invention relates to acrobatic or gymnastic paraphernalia and more particularly to simple and readily portable training devices for embryo acrobats.

The general object of the invention is to provide a novel and improved, easily constructed, and readily collapsible and portable training platform for use by beginners in learning to do handstands or headstands, and in connection with various other exercises.

The present conception presents a somewhat different approach to the problem of training beginners in acrobatics, in that it starts the novice out on a three-point balance instead of a two-point balance; that is to say, balance on the head and hands instead of hands alone, and this provision results in easier and more rapid progress, in the same way that a child learns to ride a tricycle or a bicycle with small supporting wheels at the sides, before he attempts to ride a regular bicycle.

In its preferred embodiment, the invention contemplates the provision of a flat platform having hand grips at each side of the device but nearer one end thereof than the other, thus leaving a clear space beyond the hand grips for placing the head when it is desired to accomplish a headstand.

The device as thus considered enables the beginner to master the three essential balances, namely, the head balance, the short arm balance (with forearms substantially vertical), and the long arm or hand balance, in about half the time as would ordinarily be required.

In the most preferred form of the invention, provision is made also for folding the base plate or platform, the plate being formed in two portions hinged together for facilitating this purpose.

A further feature of the invention includes the provision of latching means for maintaining the hinged plate or platform in extended position, and it is also contemplated in the preferred embodiment to make one of the hinge portions of greater width than the other whereby the hand grips will not coincide and abut when the device is collapsed for transport.

Other objects and features of novelty will be apparent from the following specification when read in connection with the accompanying drawings in which one embodiment of the invention is illustrated by way of example.

In the drawings:

Figure 1 is a view in perspective of an acrobatic apparatus embodying the features of the invention;

Figure 2 is an end view of the apparatus in folded or collapsed position;

Figure 3 is a fragmentary vertical sectional view taken on line 3—3 of Figure 1; and Figure 4 is a fragmentary sectional view taken on line 4—4 of Figure 3.

The portable handstand or headstand apparatus forming the subject of the invention is indicated generally by the reference numeral 10 in the drawings and as will be seen particularly from an examination of Figures 1 and 2, the device comprises a base plate or platform comprising two panels 11 and 12 which are preferably of the same length but unequal in width, this provision being for a purpose which will be described presently.

The two panels 11 and 12 may be made of sturdy wooden boards or of light metal construction and are hinged together as by means of the hinges 13 and 14. Extending partially along the outer lateral edges of the device 10 and disposed nearer the edge 16 of the device are the hand grips 20 and 21. These hand grips are preferably substantially cylindrical in configuration and of a diameter sufficient to provide adequate strength and also to furnish a firm grip for the neophyte acrobat or gymnast.

Th grips 20 and 21 are rigidly secured to the panels 11, 12 by means of the ring posts 23 and 24, the lower ends of which are adapted to be screwed into the panels as at 25 and the upper portions formed with rings 26 which surround the grips 20 and 21 adjacent their ends.

The hand grips, as stated, are disposed nearer the forward edge of the platform or plate and this leaves plenty of room for placing the user's head upon the platform beyond the hand grips. In order to cushion the contact, a small pad or folded towel may be placed on the platform as suggested at 28 in Figure 1 of the drawings.

In order to maintain the device in flat position for use, one or more latching devices may be provided such as illustrated at 30 and 31 in Figure 1. These devices include the hasps 32 pivoted respectively at 33 on the panels 11 and 12 and adapted to swing in a plane parallel to the outspread panels so that the hooked ends 34 of the hasps engage in the eyes 35 carried by the panels opposite to the ones in which the pivots 33 are provided. The hasps are held in hooked position as by means of the spring clips 36 most clearly shown in Figure 4 of the drawings.

When the device is collapsed and folded for transport as suggested in Figure 2 of the drawings the locking hasps 32 may be rotated to any convenient angled position along the faces of the panels as suggested in Figure 2.

It will be understood from the foregoing that there has been provided by the present invention, a readily portable practice device for novices, especially children, which may be employed in learning to do headstands and then handstands, until finally enough strength and skill are developed to enable the learner to accomplish these gymnastic stunts without the aid of apparatus or accessories.

On the other hand, the apparatus is usable by experienced acrobats such as, for example, a team of professionals where one performer works on top of the other performer's feet while the latter is balanced on his hands. This enables the lower man to obtain a firm grip and to more readily adjust his position, in response to changes of the top man's position, all without coming out of the trick due to off-balance.

Another use for the invention is as an exercise for people who consider themselves too old or too stout to perform headstands or handstands. In this use of the device the platform may be placed on a chair with the handles toward the rear. Then the exerciser sits no the platform and grasps the handles and then straightens his arms so that his body is raised from the platform and sustained by his arms. In this position the participant may then raise his legs and flex his knees and the resulting exercise will be beneficial, especially in reducing excess weight on the stomach and thighs.

Various changes and modifications may be made in the embodiment illustrated and described herein without departing from the scope of the invention as defined by the following claims.

Having thus described the invention, what is claimed as new and desired to be secured by Letters Patent is:

1. Acrobatic apparatus for use in training for practicing handstands and headstands or for other exercises, said apparatus comprising a flat substantially rectangular plate adapted to rest upon a level surface, a pair of spaced horizontal hand grips, one disposed at each side margin of said plate and nearer one end of the plate than the other, and a pair of spaced upright posts securing each of said horizontal hand grips to the plate so as to space the hand grips a short distance above the plane of the top surface of the plate, the described positioning of the hand grips leaving sufficient space adjacent the remote end of said plate as for resting the head during a headstand; said plate comprising two sections hinged together along a pivotal axis located between and parallel with said hand grips, whereby the apparatus may be collapsed to a folded condition for ready transport; said pivotal axis being nearer one side margin of said plate than the other, whereby when the apparatus is collapsed the hand grips will not abut each other but will overlap to permit closer folding of the two hinged sections of the plate.

2. Acrobatic apparatus for use in training for practicing handstands and headstands, said apparatus comprising a flat substantially rectangular plate adapted to rest upon a level surface, a pair of spaced horizontal hand grips, one disposed at each side margin of said plate and nearer one end of the plate than the other, and a pair of spaced upright posts securing each of said horizontal hand grips to the plate so as to space the hand grips a short distance above the plane of the top surface of the plate, the described positioning of the hand grips leaving sufficient space adjacent the remote end of said plate as for resting the head during a headstand; said plate comprising two sections hinged together along a pivotal axis located between and parallel with said hand grips, whereby the apparatus may be collapsed to a folded condition for ready transport.

References Cited in the file of this patent

UNITED STATES PATENTS

| | | |
|---|---|---|
| 1,307,437 | Curry | June 24, 1919 |
| 1,336,954 | Gillies | Apr. 13, 1920 |
| 1,980,105 | Staff | Nov. 6, 1934 |
| 2,006,176 | Quine | June 25, 1935 |
| 2,069,487 | Van Riper | Feb. 2, 1937 |
| 2,450,325 | Zirin | Sept. 28, 1948 |
| 2,584,742 | Schilling | Feb. 5, 1952 |